July 18, 1944.  W. G. COOK  2,354,105
CONTROL SYSTEM
Filed March 21, 1942
Fig. 1.
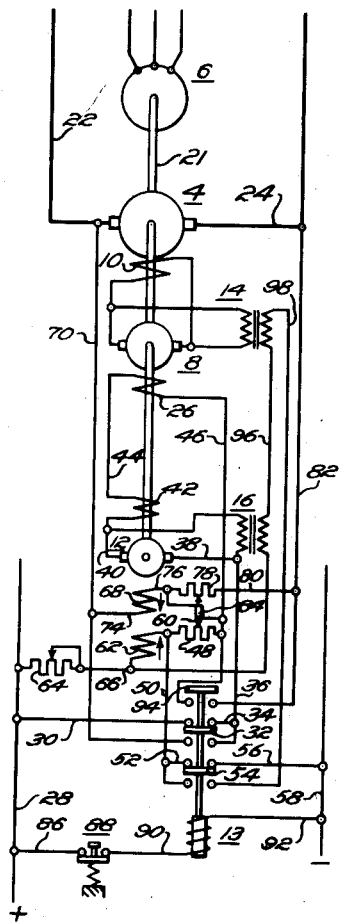
Fig. 2.
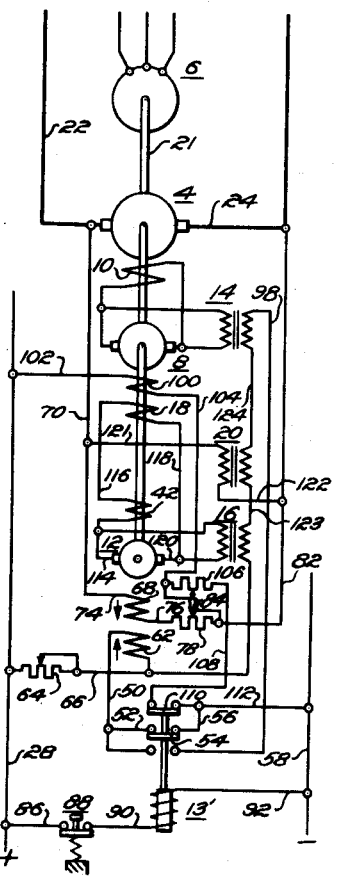
Fig. 3.
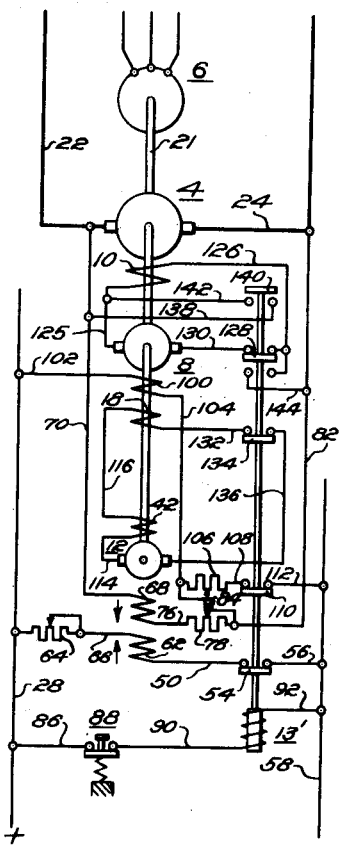
Fig. 4.
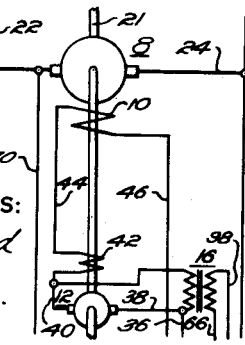
Fig. 5.
WITNESSES:
Robert C. Baird
Joe Weber
INVENTOR
Willard G. Cook.
BY
ATTORNEY Patented July 18, 1944

2,354,105

UNITED STATES PATENT OFFICE 2,354,105

CONTROL SYSTEM

Willard G. Cook, Wilkinsburg, Pa., assignor to Westinghouse Electric & Manufacturing Company, East Pittsburgh, Pa., a corporation of Pennsylvania Application March 21, 1942, Serial No. 435,694

17 Claims. (Cl. 171—223)

My invention relates, generally, to control systems, and more particularly, to systems for controlling the potentials of dynamo-electric machines.

In the operation of large electric motor driven machinery, it is common practice to accelerate and decelerate the motors by varying the excitation current of the generator which supplies power to the motors by means of a motor driven rheostat which, when driven at a constant speed, should produce a uniform rate of change of generator voltage. However, in very large generators, the time constants of the field windings are such that the desired straight line variation of the generator voltage with uniform travel of the generator field rheostat does not obtain and in such cases, the desired uniform acceleration and deceleration of the motors which are energized by the generator, is not obtained.

In the operation of large motors and associated generators such as are employed for driving rolling mills, the generators are driven continuously and the speeds of the motors are controlled by varying the excitation of the generators. However, the residual magnetism in such a generator field core will cause the generator to generate some small potential when the field windings are entirely deenergized and this small potential will cause the motors to creep when it is desired that they be at standstill.

An object of my invention is to provide a control system for generators which shall function to provide a substantially uniform rate of change of the generator potential with uniform actuation of its field rheostat, and which shall function to reduce the value of the generator potential to substantially zero when the normal excitation potential for the generator is rendered inoperative to excite the generator.

These and other objects and advantages of the invention will be apparent from the following detailed description taken in connection with the accompanying drawing, in which Figures 1 to 5 are diagrammatic representations of controy systems embodying the principal features of the preferred embodiments of the invention, and in which like reference characters designate corresponding parts.

In practicing the invention, in the embodiment of Fig. 1, a main generator 4 may be continuously driven by any suitable means, such as a motor 6. A continuously driven exciter 8 is connected to energize the field winding 10 of the main generator 4. An auxiliary generator 12 is connected to affect the excitation of the exciter 8 and functions, in response to the difference between the voltage of the main generator and the desired voltage of the main generator, to force the excitation of the main generator. A relay 13 functions to selectively connect the excitation control system for the main generator for normal running and for effecting quick and complete demagnetization of the field cores of the main generator as desired. Damping transformers 14 and 16 are connected to prevent oscillations of the main generator voltage while the system is functioning to demagnetize the field cores of the main generator.

The embodiment of the invention shown in Fig. 2 is similar to that of Fig. 1 but has a separate compensating winding 18 for the exciter 8 energized by the auxiliary generator 12. Damping transformers 14, 16 and 20 are employed in this embodiment of the invention.

In the embodiment of the invention of Fig. 3, the main generator field winding may be connected directly for energization by the main generator 4 when it is desired to demagnetize the main generator.

The embodiments of the invention shown in Figs. 4 and 5 are the same as those of Figs. 1 and 2 with the exception that the field winding of the main generator in the embodiments of Figs. 4 and 5 is connected for direct energization without the use of an exciter generator for the main generator.

Considering the invention more in detail, the main generator 4, the exciter 8, and the auxiliary generator 12 may be continuously driven by the motor 6 through a shaft 21. The main generator 4 is connected to conductors 22 and 24 to which may be connected motors (not shown) whose speed is to be controlled by armature current control and whose speed will, therefore, be controlled by the potential of the main generator 4.

The exciter 8 has a field winding 26 which is connected to be energized by a source of direct-current power of substantially constant potential indicated by the plus (+) and minus (—) signs in a circuit which extends from positive potential through conductors 28 and 30, a contact element 32 of the relay 13, conductors 34, 36 and 38, the armature of the auxiliary generator 12, a conductor 40, a cumulative series field winding 42 of the auxiliary generator 12, a conductor 44, the exciter field winding 26, a conductor 46, a variable resistor 48, conductors 50 and 52, a contact element 54 of the relay 13, and conductors 56 and 58 to negative potential. The movable contact element 60 of the variable resistor 48 may be adjusted to so adjust the potential of the exciter 8 as to provide the necessary excitation of the generator 4 for the desired main generator potential.

The auxiliary generator 12 is provided with a field winding 62 which is connected for substantially constant energization to the source of power in a circuit extending from positive potential through the conductor 28, a variable resistor 64, a conductor 66, the field winding 62, conductors 50 and 52, the contact element 54, and the conductors 56 and 58 to negative potential. The auxiliary generator 12 is provided with another field winding 68 which is connected to be energized by the main generator 4 in a circuit extending from one terminal of the main generator 4 through conductors 22, 70 and 74, the field winding 68, a conductor 76, a variable resistor 78, and conductors 80, 82 and 24 to the other terminal of the main generator 4. The movable contact elements of the variable resistors 48 and 78 may be arranged to be moved by a common movable element 84, which may be an element driven by a rheostat motor at a substantially constant speed to provide substantially uniform variation of the potential of the main generator 4. The variable resistors 48 and 78 are so arranged that the effective resistance of each will be decreased simultaneously with an increase of the effective resistance of the other when the movable element 84 is actuated.

The relay 13 may be continuously energized in a circuit extending from positive potential through conductors 28 and 86, a normally closed circuit control device 88, a conductor 90, the winding of the relay 13 and conductors 92 and 58 to negative potential. To normally maintain the contact elements 32 and 54 in the front contact position to complete the circuits hereinbefore described when the relay 13 is deenergized by actuation of the circuit control device 88, the energizing circuits connecting the field windings 26 and 62 to the source of power of substantially constant potential will be broken, the field winding 26 will be connected to be energized by the main generator 4, and the field winding 62 will be connected to be energized in a circuit including the secondary windings of the transformers 14 and 16.

The energizing circuit for the field winding 26 when the relay 13 is deenergized extends from one terminal of the main generator 4 through the conductors 22 and 70, the contact element 32, the conductors 36 and 38, the armature of the auxiliary generator 12, the conductor 40, the series field winding 42, the conductor 44, the exciter field winding 26, the conductor 46, a contact element 94 of the relay 13, and the conductors 82 and 24 to the other terminal of the main generator 4. The energizing circuit for the field winding 62 of the auxiliary generator 12, when the relay 13 is deenergized, extends from one terminal of the field winding 62 through the conductor 66, the secondary winding of the transformer 16, a conductor 96, the secondary winding of the transformer 14, a conductor 98, the contact element 54, and the conductor 50 to the other terminal of the field winding 62. The primary windings of the transformers 14 and 16 may be connected as indicated to respond to the potentials of the exciter 8 and the auxiliary generator 12, respectively.

In the operation of the system of Fig. 1, when the main generator 4 is operating to supply power to its load circuit, the field windings 62 and 68, which are connected to increase and decrease, respectively, the excitation of the auxiliary generator 12 in a direction to cause the generator 12 to add or to subtract from the energization of the field winding 26, will be equally energized and will, therefore, provide no net excitation for the auxiliary generator 12.

When it is desired to increase the speed of the motors (not shown) connected to the load circuit by increasing the potential of the main generator 4, the movable element 84 may be moved in the left-hand direction to decrease the effective resistance of the circuit of the field winding 26 and thus increase the excitation of the exciter 8. This increase of the potential of the exciter 8 will increase the excitation of the main generator 4 and thus increase its output potential.

The movement of the movable contact element of the variable resistor 78 in the left-hand direction will decrease the energization of the field winding 68 for a given potential applied in the energizing circuit of the field winding 68 by the main generator 4, and there will be an increase in the net excitation of the generator 12 in a direction to further increase the energization of the field winding 26 until the potential of the main generator 4 has increased sufficiently to cause the exciting effect of the field winding 68 to balance and counteract the energization due to the field winding 62 to thus produce substantially zero excitation of the auxiliary generator 12 by the combined effect of the field windings 62 and 68.

Thus, when the energizing potential applied to the field winding 10 of the main generator 4 is increased to increase the potential of the generator 4, if there is a lag in the increase of the excitation of the generator 4, the auxiliary generator 12 will cause a further increase in the energization of the field winding 26 to force the increase in the excitation of the main generator 4 to compensate for the time lag in building up the excitation of the generator 4 when its field energization is increased.

In a similar manner, when it is desired to decelerate or reduce the speed of the motors which are connected to the main generator 4 by decreasing the potential of the generator 4, the contact elements of the variable resistors 48 and 78 may be moved to the right-hand position, and if there is any lag in the decrease of the potential of the generator 4 behind the decrease of the energization of its field winding 10, its potential applied to the field winding 68 will cause an overbalance of the exciting effect of the field winding 68 over that of the field winding 62 and the net excitation of the auxiliary generator 12 in a direction to further decrease the energization of the field winding 26, and, in turn, the energization of the field winding 10, will result to hasten the decrease of the excitation of the generator 4. The variable resistor 64 in the circuit of the field winding 62 may be adjusted to provide the desired energization of the field winding 62 to thereby provide the desired normal net excitation of the auxiliary generator 12.

When it is desired to stop the motors which are connected to the main generator 4 by decreasing the potential of the main generator 4 to substantially zero, the variable resistor 48 may be actuated to decrease the potential of the generator 4 and when the potential of the generator 4 has been decreased to as low a value as can be controlled by the variable resistor 48, the circuit control device 88 may be opened to deenergize the relay 13. The relay 13 will connect the field winding 26 of the exciter 8 and the auxiliary generator 12 in a circuit to be energized by the main generator 4 as hereinbefore described, and the current flow in the field winding 26 will be in such a direction as to produce an excitation of the generator 4 which will tend to produce a main generator potential of opposite polarity to its normal polarity.

This reversed energization of the field winding 10 will be further accentuated by the auxiliary generator 12 whose field winding 68 is energized by the generator 4 in a direction to cause the auxiliary generator 12 to increase the energization of the field winding 26 in such a direction as to cause the increase in the energization of the field winding 10 in a reverse direction to its normal energization. Thus, any residual potential of the generator 4 due to residual magnetism in its field cores will be neutralized and the potential of the generator 4 will be held at substantially zero value since any potential of the generator 4 in the normal direction will act upon the auxiliary generator 12 and the field winding 26 to excite the generator 4 in a direction to counterbalance the effect of its residual magnetism.

In order to prevent a swing of the potential of the main generator 4 through zero and to a substantial value in the opposite direction when the demagnitizing forces are applied to its field winding 10, the change of potentials of the exciter 8 and the auxiliary generator 12 will act on the transformers 14 and 16 to induce a potential in the secondary windings of the transformers of a magnitude proportionate to the rate of change of the potentials of the exciter 8 and the auxiliary generator 12, and this potential in the secondary windings of the transformers 14 and 16 will be applied to the field winding 62 of the auxiliary generator 12 in a direction to oppose the increase of the potential of the auxiliary generator 12.

This action of the transformers 14 and 16 on the auxiliary generator 12 will thus damp or slow down the effect of the auxiliary generator 12 to decrease the potential of the main generator 4 in proportion to the rate of decrease of the potential of the generator 4 and the potential of the generator 4 will be decreased to zero without an alternate swing of the potential of the generator 4 in opposite directions from the zero point when the potential decreasing forces are applied to the generator by the deenergization of the relay 13.

In the embodiment of the invention of Fig. 2, like reference characters have been applied to corresponding elements and additional reference characters have been applied to additional elements and additional and different circuits. In this embodiment of the invention, the exciter generator 8 is provided with separate field windings 18 and 100. The field winding 100 may be energized from the source of power of substantially constant potential in a circuit extending from positive potential through conductors 28 and 102, the field winding 100, a conductor 104, a variable resistor 106, a conductor 108, a contact element 110 of a relay 13' and conductors 112 and 58 to negative potential.

The field winding 18 of the exciter 8 may be connected to be energized by the auxiliary generator 12 in a circuit extending from one terminal of the generator 12 through a conductor 114, a series field winding 42 of the generator 12, a conductor 116, the field winding 18 and conductors 118 and 120 to the other terminal of the generator 12. An additional damping transformer 20 has its primary winding connected to be energized by the main generator 4 in a circuit which extends from one terminal of the generator 4 through conductors 22, 70 and 121, the primary winding of the transformer 20, and conductors 122, 82 and 24 to the other terminal of the generator 4. The secondary windings of the transformers 14, 16 and 20 may be connected to energize the field winding 62 of the auxiliary generator 12 when the relay 13' is deenergized in a circuit which extends from one terminal of the field winding 62 through the conductor 66, the secondary winding of the transformer 16, a conductor 123, the secondary winding of the transformer 20, a conductor 124, the secondary winding of the transformer 14, the conductor 98, the contact element 54, and the conductor 59 to the other terminal of the field winding 62.

The functioning of the embodiment of the invention shown in Fig. 2 is substantially the same as that of the system of Fig. 1, with the exception that the auxiliary generator 12 is connected to effect the excitation of the exciter 8 by means of a separate field winding 18 instead of in series circuit with the single field winding 26 as in the system of Fig. 1.

The damping effect to prevent excessive swings of the potential of the generator 4 when it is being demagnetized to produce zero potential is further accentuated in the system of Fig. 2 by the addition of the transformer 20 which is affected by the rate of change of the potential of the generator 4 just as the transformers 14 and 16 are affected by the rate of change of the potentials of the exciter 8 and the auxiliary generator 12.

It is to be understood that a greater or smaller number of damping transformers may be employed in the embodiments of the invention shown in Figs. 1, 2, 4 and 5. Thus a damping transformer similar to the transformer 20 of Figs. 2 and 5 may be added to the systems of Figs. 1 and 4, and any one or more of the damping transformers may be employed in the systems of Figs. 1, 2, 4 and 5. In the event that it is found necessary to increase the damping effect when the relays 13 and 13' are deenergized to apply reversed potential to the field winding of the generator for the purpose of forcing the demagnetization of the generator field core, connections may be made to permit the relays 13 and 13' to reverse the connection to the series field windings 42 to provide differential series excitation for the auxiliary generators 12.

The embodiments of the invention of Figs. 1 and 2 comprise generator systems of unidirectional polarity such as would be employed to supply power to the motors of a continuous rolling mill. If it should be necessary to reverse the potential of the generators to thereby reverse the associated mill motors, a reversing control device may be provided for reversing the connections of the field winding 62 in the embodiments of the invention shown in Figs. 1 and 4, and the field windings 62 and 100 in the embodiments of the invention of Figs. 2 and 5.

In the embodiment of the invention shown in Fig. 3, the field winding 10 of the main generator 4 may be connected to be energized normally by the exciter 8 in a circuit which extends from one terminal of the exciter 8 through a conductor 125, the field winding 10, a conductor 126, a contact element 128 of the relay 13', and a conductor 130 to the other terminal of the exciter 8.

The auxiliary generator 12 is connected to energize the field winding 18 of the exciter 8 in a circuit extending from one terminal of the auxiliary generator 12 through the conductor 114, the series field winding 42, the conductor 116, the field winding 18, a conductor 132, a contact element 134 of the relay 13' and a conductor 136 to the other terminal of the auxiliary generator 12.

These connections of the field windings 18 and 10 are the equivalent of the connections shown and described in the embodiment of the invention of Fig. 2, and the other connections are the same as those shown in Fig. 2 for the normal operation of the system, so that its functioning to provide a uniform rate of change of the potential of the generator 4 with the uniform rate of movement of the rheostat operating element 84 will be the same as that of the system of Fig. 2.

When the relay 13' is deenergized by the actuation of the circuit control device 88, the field windings 100, 18 and 62 will be deenergized by movement of the contact elements 134, 110 and 54 to open circuit position. The deenergization of the relay 13' will close a circuit whereby the field winding 10 is energized by the main generator 4 which extends from one terminal of the generator 4 through conductors 22, 70 and 138, a contact element 140 of the relay 13' in back contact position, conductors 142 and 125, the field winding 10, the conductor 126, the contact element 128 in back contact position, and conductors 144, 82 and 24 to the other terminal of the generator 4.

This connection of the field winding 10 will be such as to cause the potential of the generator 4 to be applied to the field winding 10 in a direction opposite to the normal energization of the field winding 10 to thereby cause the excitation of the generator 4 to be decreased in proportion to the remaining potential of the generator 4 in its normal direction. Thus, any tendency of the residual magnetism in the cores of the field windings of the generator 4 will cause the generator 4 to generate a potential in the direction to cause its field winding 10 to counteract the magnetizing effect of its residual magnetism.

The circuit connections of Fig. 4 illustrate a method of connection of the system of Fig. 1 where the field winding 10 is substituted for the field winding 26 and the exciter 8 is eliminated. The functioning of the system where the connections of Fig. 4 are substituted for the corresponding connections of Fig. 1 will be substantially the same as the functioning of the system of Fig. 1 except that the excitation of the main generator 4 will be derived directly from the source of power of substantially constant potential in series circuit relation with the auxiliary generator 12 instead of indirectly through the exciter 8 as shown in the system of Fig. 1. With the system of Fig. 1 modified as shown by the connections of Fig. 4, the transformer 14 will, of course, be eliminated.

The connections of Fig. 5 may be substituted for corresponding connections of Fig. 2 and illustrate how the exciter 8 and the field winding 10 may be replaced by directly applying the field windings 100 and 18 to the main generator 4 instead of connecting the generator 4 to be effected by the field windings 18 and 100 indirectly through the exciter 8 and the main generator field winding 10. The damping transformer 14 will not be necessary to the functioning of the system of Fig. 2 when modified in accordance with the connections shown in Fig. 5, since the exciter 8 from which the transformer 14 is energized will not be used in this system of connections. The functioning of the system of Fig. 2 when modified in accordance with the connections of Fig. 5 will be substantially the same as that described hereinbefore in connection with the functioning of the system of Fig. 2 with the exception that the field windings 18 and 100 will be considered as acting directly upon the main generator 4.

The series field winding 42 for the auxiliary generator 12 may be made to provide any degree of compounding of the auxiliary generator 12 and may be eliminated if desired, when such compounding is found to be unnecessary.

Thus it will be seen that I have provided a control system for generators which shall function to provide a substantially uniform rate of change of the generator potential with uniform actuation of its field rheostat and which shall function to reduce the value of the generator potential to substantially zero when the normal excitation potential for the generator is rendered inoperative to excite the generator.

In compliance with the requirements of the patent statutes, I have shown and described herein the preferred embodiments of my invention. It is to be understood, however, that the invention is not limited to the precise construction shown and described but is capable of modification by one skilled in the art, the embodiments shown herein being merely illustrative of the principles of my invention.

I claim as my invention:

1. In a control system for a variable voltage generator, a source of potential for exciting said generator, means for adjusting the potential supplied by the said source of potential for exciting the generator, means for further varying the potential acting to excite the generator in accordance with the difference between the generator potential and the potential for which the generator is adjusted, and means for applying a potential proportionate to the generator potential to excite the generator in an opposite sense to its normal excitation when it is desired to reduce the generator potential to substantially zero value.

2. In a control system for a variable potential generator, means for selectively adjusting the excitation of the generator to thereby adjust its potential, means for varying the excitation of the generator in accordance with the difference between a potential corresponding to the selectively adjusted potential and the actual potential of the generator, and means for applying excitation to the generator proportional to the generator potential and in an opposite sense to the normal excitation when it is desired to reduce the generator potential to substantially zero.

3. In a control system for a variable potential generator, means for selectively adjusting the excitation of the generator to thereby adjust its potential, an auxiliary means for varying the excitation of the generator, means for varying the exciting effect of said auxiliary means in accordance with the difference between the generator potential and the potential for which the generator is selectively adjusted, and means for causing said auxiliary means to vary the excitation of the generator in proportion to the generator potential and in an opposite sense to the normal excitation of the generator when it is desired to reduce the generator potential to substantially zero.

4. In a control system for a variable potential main generator, means for selectively adjusting the excitation of the main generator to thereby adjust its potential, an auxiliary generator connected to affect the excitation of the main generator, means for varying the potential of the auxiliary generator in accordance with the difference between the main generator potential and the potential for which the main generator is selectively adjusted, and means for varying the potential of the auxiliary generator in an opposite sense to its normal potential and in proportion to the main generator potential when it is desired to reduce the main generator potential to substantially zero.

5. In a control system for a variable potential main generator, an exciter for the main generator, a first exciting circuit for the exciter, means for selectively adjusting the energization of the first exciting circuit to thereby selectively adjust the main generator potential, a second exciting circuit for the exciter, an auxiliary generator connected in the second exciting circuit, means for varying the potential of the auxiliary generator in accordance with the difference between the main generator potential and the potential for which the main generator is selectively adjusted, and means for simultaneously disconnecting the exciter from the main generator field winding and connecting the main generator field winding to be energized in accordance with the main generator potential in an opposite sense to the normal main generator excitation when it is desired to reduce the main generator potential to substantially zero.

6. In a control system for a variable potential generator, means for selectively adjusting the excitation of the generator to thereby adjust its potential, means for varying the excitation of the generator in accordance with the difference between a potential corresponding to the selectively adjusted potential and the actual potential of the generator, means for applying excitation to the generator proportional to the generator potential and in an opposite sense to the normal excitation when it is desired to reduce the generator potential to substantially zero, and means for opposing the reduction of the generator potential in proportion to the rate of change of said excitation of the opposite sense to the normal excitation.

7. In a control system for a variable potential main generator, means for selectively adjusting the excitation of the main generator to thereby adjust its potential, an auxiliary generator connected to affect the excitation of the main generator, means for varying the potential of the auxiliary generator in accordance with the difference between the main generator potential and the potential for which the main generator is selectively adjusted, means for varying the potential of the auxiliary generator in an opposite sense to its normal potential and in proportion to the main generator potential when it is desired to reduce the main generator potential to substantially zero, and means for opposing the change of the potential of the auxiliary generator in the said opposite sense in proportion to the change of potential of the auxiliary generator.

8. In a control system for a variable potential main generator, means for selectively adjusting the excitation of the main generator to thereby adjust its potential, an auxiliary generator connected to affect the excitation of the main generator, means for varying the potential of the auxiliary generator in accordance with the difference between the main generator potential and the potential for which the main generator is selectively adjusted, means for varying the potential of the auxiliary generator in an opposite sense to its normal potential and in proportion to the main generator potential when it is desired to reduce the main generator potential to substantially zero, and means for opposing the change of the potential of the auxiliary generator in the said opposite sense in proportion to the change of potential of the auxiliary generator, the change of the excitation of the main generator and the change of potential of the main generator.

9. In a control system for a variable potential main generator, first variable resistance means operable to selectively vary the excitation of the main generator to thereby adjust its potential to different values, an auxiliary generator excited in accordance with the potential of the main generator connected to affect the excitation of the main generator, and second variable resistance means disposed to be actuated in conjunction with said first variable resistance means for automatically varying the excitation of the auxiliary generator to cause it to develop a potential in accordance with the difference between the main generator potential and the potential for which said main generator is selectively adjusted by the first variable resistance means, thereby to effect a uniform rate of change in the potential of the main generator in accordance with a uniform operation of the first variable resistance means.

10. In a control system for a variable potential main generator, means providing excitation energy for the main generator comprising an exciting circuit energized from a source of substantially constant potential, a first field rheostat operable to selectively adjust the energization of the exciting circuit to thereby selectively adjust the main generator potential to different values, an auxiliary generator connected in the exciting circuit, said auxiliary generator being differentially excited in accordance with the potential of the main generator and the constant potential source, a second field rheostat disposed for simultaneous operation with said first field rheostat for varying the excitation of the auxiliary generator to cause said generator to automatically vary its potential in accordance with the difference between the main generator potential and the potential for which the main generator is selectively adjusted to subject the excitation of the main generator to a forcing action whereby its potential is caused to vary uniformly in accordance with the uniform operation of said first field rheostat.

11. In a control system for a variable potential main generator, means providing excitation energy for the main generator comprising a first exciting circuit, first means operable to selectively adjust the energization of the first exciting circuit to thereby selectively adjust the main generator potential to different values, a second exciting circuit, an auxiliary generator connected in the second exciting circuit and operable to affect the energization thereof, and second means operable in unison with said first means for varying the excitation of the auxiliary generator to cause said generator to develop a potential in accordance with the difference between the main generator potential and the potential for which the main generator is selectively adjusted by said first means.

12. In a control system for a variable potential main generator, an exciter for the main generator, means operable to selectively adjust the excitation of the exciter to thereby adjust the generator potential to different values, an auxiliary generator connected to affect the excitation of the exciter, said auxiliary generator being excited in accordance with the potential of the main generator and a predetermined constant potential, and means operable in conjunction with said first-mentioned means for automatically varying the excitation of the auxiliary generator in predetermined relation and degree to the variation in excitation of the exciter to cause said auxiliary generator to develop a potential in accordance with the difference between the main generator potential and the potential for which the main generator is selectively adjusted.

13. In a control system for a variable potential main generator, an exciter for the main generator, an exciting circuit for the exciter, first resistor means operable to selectively adjust the energization of the exciting circuit to thereby selectively adjust the main generator potential to different values, an auxiliary generator connected in the exciting circuit and operable to affect the energization thereof, and second resistor means disposed for simultaneous operation with said first resistor means for varying the excitation of the auxiliary generator to cause said auxiliary generator to vary its potential in accordance with the difference between the main generator potential and the potential for which the main generator is adjusted by the operation of the first resistor means.

14. In a control system for a variable potential main generator, an exciter for the main generator, a first exciting circuit for the exciter, first resistor means operable to selectively adjust the energization of the first exciting circuit to thereby selectively adjust the main generator potential to different values, a second exciting circuit for the exciter, an auxiliary generator connected in the second exciting circuit, and second resistor means disposed for simultaneous operation with said first resistor means for varying the excitation of the auxiliary generator to cause said auxiliary generator to vary its potential in accordance with the difference between the main generator potential and the potential for which the main generator is selectively adjusted, thereby to cause the potential of the main generator to change uniformly with the operation of said first resistor means.

15. In a control system for a variable potential main generator, means for selectively adjusting the excitation of the main generator to thereby adjust its potential to different values, an auxiliary generator connected to affect the excitation of the main generator, said auxiliary generator being ineffective when the main generator is operating at the potential for which it has been adjusted, and means actuated in accordance with the said means for selectively adjusting the potential of the main generator operable to vary the excitation of the auxiliary generator to cause said auxiliary generator to become effective and develop a potential of such polarity as to correspond to the sense in which the excitation of the main generator is adjusted, thereby to cause the potential of the main generator to change at a substantially uniform rate with uniform actuation of its excitation adjusting means.

16. In a control system for a variable potential main generator, means for selectively adjusting the excitation of the main generator to thereby adjust its potential to different values, an auxiliary generator connected to affect the excitation of the main generator, said auxiliary generator having its excitation determined jointly in accordance with a predetermined potential of substantially constant value and the potential of the main generator, and means actuated concurrently with the means for selectively adjusting the excitation of the main generator for simultaneously adjusting the excitation of the auxiliary generator as determined by the potential of the main generator to cause said auxiliary generator to vary its potential in accordance with and in the same direction as the excitation of the main generator is varied, thereby to cause the potential of the main generator to change uniformly in accordance with the operation of its excitation adjusting means and without an appreciable time lag which would otherwise result due to the time constants of its field excitation winding.

17. A control system for a variable potential generator, an exciter for the generator having a field excitation winding energized from a source of constant potential, a first field rheostat for varying the energization of said field winding to vary the potential of the main generator, an auxiliary generator having its armature connected in series circuit relation with the field winding of the exciter for affecting the energization thereof, said auxiliary generator having first and second differentially related field excitation windings, the first of which is energized from said constant potential source and the second of which is energized in accordance with the potential of the main generator, a second field rheostat for varying the energization of the second field winding, said first and second field rheostats being connected for simultaneous operation and functioning when so operated to vary the potential of the exciter and cause the auxiliary generator to vary its potential in accordance with the difference between the potential of the main generator and the potential thereof determined by the setting of the first field rheostat, whereby the main generator excitation is subjected to a forcing action by the auxiliary generator such as to cause its potential to change uniformly with the operation of the said first field rheostat.

WILLARD G. COOK.